US006714191B2

(12) United States Patent
Wu et al.

(10) Patent No.: US 6,714,191 B2
(45) Date of Patent: Mar. 30, 2004

(54) METHOD AND APPARATUS FOR DETECTING FLICKER IN AN LCD IMAGE

(75) Inventors: Che Ming Wu, San Gabriel, CA (US); Vincent Wang, San Jose, CA (US); Jih Hsien Soong, Cupertino, CA (US)

(73) Assignee: Genesis Microchip Inc., Alviso, CA (US)

(*) Notice: Subject to any disclaimer, the term of this patent is extended or adjusted under 35 U.S.C. 154(b) by 203 days.

(21) Appl. No.: 09/957,663

(22) Filed: Sep. 19, 2001

(65) Prior Publication Data

US 2003/0052853 A1 Mar. 20, 2003

(51) Int. Cl.[7] .................................... H04N 11/20
(52) U.S. Cl. .................................... 345/204; 348/447
(58) Field of Search .................................... 348/446, 442; 345/103, 89, 88, 93, 419, 204, 214

(56) References Cited

U.S. PATENT DOCUMENTS 5,963,190 A * 10/1999 Tsuboyama et al. ........ 345/103
6,094,226 A * 7/2000 Ke et al. .................... 348/446
6,346,970 B1 * 2/2002 Boehlke ..................... 348/447
6,525,723 B1 * 2/2003 Deering ...................... 345/419

* cited by examiner

*Primary Examiner*—Vijay Shankar
*Assistant Examiner*—Nitin Patel
(74) *Attorney, Agent, or Firm*—Beyer Weaver & Thomas, LLP

(57) ABSTRACT

A method, system and apparatus for detecting a sub-pixel pair susceptible of producing a flicker event in an image from a video signal source displayed on a liquid crystal display (LCD) unit is described. A two dimensional flicker pattern analysis is performed on a selected group of sub-pixels some of which are included in a first plurality of sub-pixels that includes a first current sub-pixel and a first next sub-pixel included in a first video frameline and a remainder of which are included in a second plurality of sub-pixels included in a second video frameline that is received, in real time, from the video signal source that includes a second current sub-pixel and a second current sub-pixel.

43 Claims, 14 Drawing Sheets

METHOD AND APPARATUS FOR DETECTING FLICKER IN AN LCD IMAGE

BACKGROUND OF THE INVENTION

1. Field of the Invention

The invention relates to liquid crystal displays (LCDs). More specifically, the invention describes a method and apparatus for detecting flicker in a digital image displayed on a liquid crystal display.

2. Discussion of Related Art

Liquid crystal displays (LCDs) are significantly lighter in weight and slimmer, consume far less energy and can reproduce a wider range of colors than any competing technologies. Accordingly, LCDs are increasingly being used for the display device in televisions, personal computers, etc., and in many state-of-the-art equipment such as automotive navigation systems and simulation devices.

Using contemporary LCD technology, an electric field is applied to liquid crystal material having an anisotropic dielectricity that is injected between two substrates (an array substrate and a counter substrate) that are arranged substantially parallel to one another with a predetermined gap between them. A displayed image is obtained by controlling an intensity of the electric field that, in turn, controls the amount of light permeating the substrates. In contrast to passive matrix type LCDs, active matrix type LCDs include a plurality of gate lines placed parallel to one another disposed on a substrate and a plurality of data lines insulated from and crossing the gate lines. A number of pixel electrodes are formed corresponding to respective regions defined by the intersecting data lines and gate lines. Furthermore, a thin film transistor (TFT) is provided near each of the intersections of the gate lines and the data lines. Each pixel electrode is connected to a data line via a corresponding TFT, the TFT serving as a switching device. Typically, each TFT has a gate electrode, a drain electrode, and a source electrode where the pixel electrodes are connected to the drain electrodes. The electric field applied to the liquid crystal material is generated by a difference in levels of a common voltage and a data voltage applied respectively to the common electrodes and the pixel electrodes in the LCD such that the intensity of the electric field is controlled by changing data voltage or common voltage levels.

Since the liquid crystal material degrades if the electric field is applied to the liquid crystal material continuously in the same direction, the direction in which the electric field is applied must be constantly changed. Namely, a value of the data voltage minus the common voltage must be repeatedly alternated from a positive value (hereinafter referred to as positive voltage) to a negative value (hereinafter referred to as negative voltage). Such a switching of electrode voltage values between positive and negative values is referred to as inversion drive. Among the different types of inversion drive methods are frame inversion, line inversion, dot inversion, and column inversion methods. In frame inversion, for example, (in which the polarity of data voltage is inverted to frame cycles (typically 60 Hz), positive voltage is applied in odd frames, while negative voltage is applied in even frames.

Unfortunately, however, what is referred to as a kickback voltage is generated by parasitic capacitance in the pixels such that the RMS of the positive voltage is different from the RMS of the negative voltage. Accordingly, the amount of light permeating the liquid crystal material in the odd frames and that of light permeating the liquid crystal material in the even frames is different resulting in what is commonly referred to as screen (or luminance) flicker observed in units of one-half of frame frequency of, for instance, 60 Hz (or 30 Hz).

LCD, or luminance, flicker (which is inherent in the majority of LCD flat panels when) has been a primary concern for applications that require the display of high contrast, high density, moving data in that the continual luminance flicker can cause serious eye fatigue to the user resulting in difficulty in interpreting the displayed information, for example. Since flicker is inherent in the majority of LCD flat panels but varies with a number of factors, such a refresh rate, displayed motion, etc. various systems for identifying particular frames of video data having a high likelihood of a displayed image having an unacceptable amount of flicker have been developed. One such system 100 is illustrated in FIG. 1A showing a conventional approach to detecting flicker in an image to be displayed on an LCD flat panel screen 102. As shown in FIG. 1A, in an attempt to identify a "bad" flicker pattern formed of a number of "bad" pixel pairs, the flat panel screen 102 (which for this example is 1024 pixels by 768 pixels) is divided into a number of blocks 104 which are, in turn, further divided into segments 106. In this example, each of the segments 106 is 64 pixels wide for a total of 16 segments per frameline (of which there are 768) for a total of 12288 segments.

Using the system 100, each of the segments 106 are tested for a number X of "bad" pixel pairs included therein. The number of bad pixel pairs per segment is then compared to a pre-determined bad segment threshold number $X_t$ which determines whether or not a particular segment is classified as a "bad segment". Once the number and location of bad segments within each block is determined, an evaluation is made on a block by block basis of the number of bad segments per block. The result of this evaluation is compiled into what is referred to as a bad segment number which, in turn, is used to ultimately identify bad frames, or those frames prone to produce flicker on the flat panel screen 102.

This situation is best illustrated in FIG. 1B, showing the flat panel screen 102 having a number of segments 106 identified as bad segments 108. Although the system 100 is capable of identifying potential a flicker inducing pattern 110 such as that shown to be within the block 104-1 where the bad pixel pairs conveniently fall within a predefined segment, the system 100, however, can not identify a pattern 112 where associated bad pixel pairs are included in more than one segment and/or cross block boundaries.

Therefore what is desired is an efficient method and apparatus for identifying flicker prone patterns in an image to be displayed on an LCD monitor.

SUMMARY OF THE INVENTION

According to the present invention, methods, apparatus, and systems are disclosed for identifying flicker prone patterns in an image to be displayed on an LCD monitor are disclosed.

In one embodiment, a flicker pattern detector coupled to a video signal source suitable for detecting a sub-pixel pair susceptible to producing a flicker event in an image displayed on a liquid crystal display (LCD) unit is described. The flicker pattern detector includes a two dimensional flicker pattern analyzer arranged to perform a two dimensional flicker pattern analysis on a selected group of sub-pixels some of which are included in a first plurality of sub-pixels that includes a first current sub-pixel and a first next sub-pixel included in a first video frameline and a remainder of which are included in a second plurality of sub-pixels included in a second video frameline that is received, in real time, from the video signal source that includes a second current sub-pixel and a second next sub-pixel. The two dimensional flicker pattern analyzer includes a first storage device suitable for storing the first plurality of sub-pixels, a second storage device coupled to the first storage device suitably arranged to store the first current sub-pixel, a third storage device arranged to store a the second current sub-pixel, and a comparator unit coupled to the first storage device, the second storage device and the third storage device. The comparator unit is arranged to perform a two dimensional compare operation, and update a final flicker frame score based upon the compare operation indicative of the susceptibility of producing a flicker event in an image displayed on a liquid crystal display (LCD) unit.

In a preferred embodiment, the flicker detector also includes a one dimensional flicker pattern analyzer arranged to perform a one dimensional flicker pattern analysis on a previous sub-pixel and a current sub-pixel that includes a fourth storage device suitable for storing the previous sub-pixel, a second comparator unit coupled to the fourth storage device arranged to compare the previous sub-pixel and a current sub-pixel received in real time from the video signal source and based upon the compare, updates the final flicker frame score.

In another embodiment, a method for detecting a sub-pixel pair susceptible of producing a flicker event in an image from a video signal source displayed on a liquid crystal display (LCD) unit. A two dimensional flicker pattern analysis is performed on a selected group of sub-pixels some of which are included in a first plurality of sub-pixels that includes a first current sub-pixel and a first next sub-pixel included in a first video frameline and a remainder of which are included in a second plurality of sub-pixels included in a second video frameline that is received, in real time, from the video signal source that includes a second current sub-pixel and a second current sub-pixel.

In a preferred embodiment, the first current sub-pixel is compared to the first previous sub-pixel, the first current sub-pixel is compared to the second current sub-pixel, the second current sub-pixel is compared to the second previous sub-pixel, and the second previous sub-pixel is compared to the first previous sub-pixel. The flicker frame score is updated based upon the comparisons.

In yet another embodiment, computer program product for enabling a computer to perform a method for detecting a sub-pixel pair susceptible of producing a flicker event in an image from a video signal source displayed on a liquid crystal display (LCD) unit is disclosed. The computer program product includes computer code for performing a two dimensional flicker pattern analysis on a selected group of sub-pixels some of which are included in a first plurality of sub-pixels that includes a first current sub-pixel and a first previous sub-pixel included in a first video frameline and a remainder of which are included in a second plurality of sub-pixels included in a second video frameline that is received, in real time, from the video signal source that includes a second current sub-pixel and a second previous sub-pixel and computer readable medium for storing the computer code.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Figure 1A:
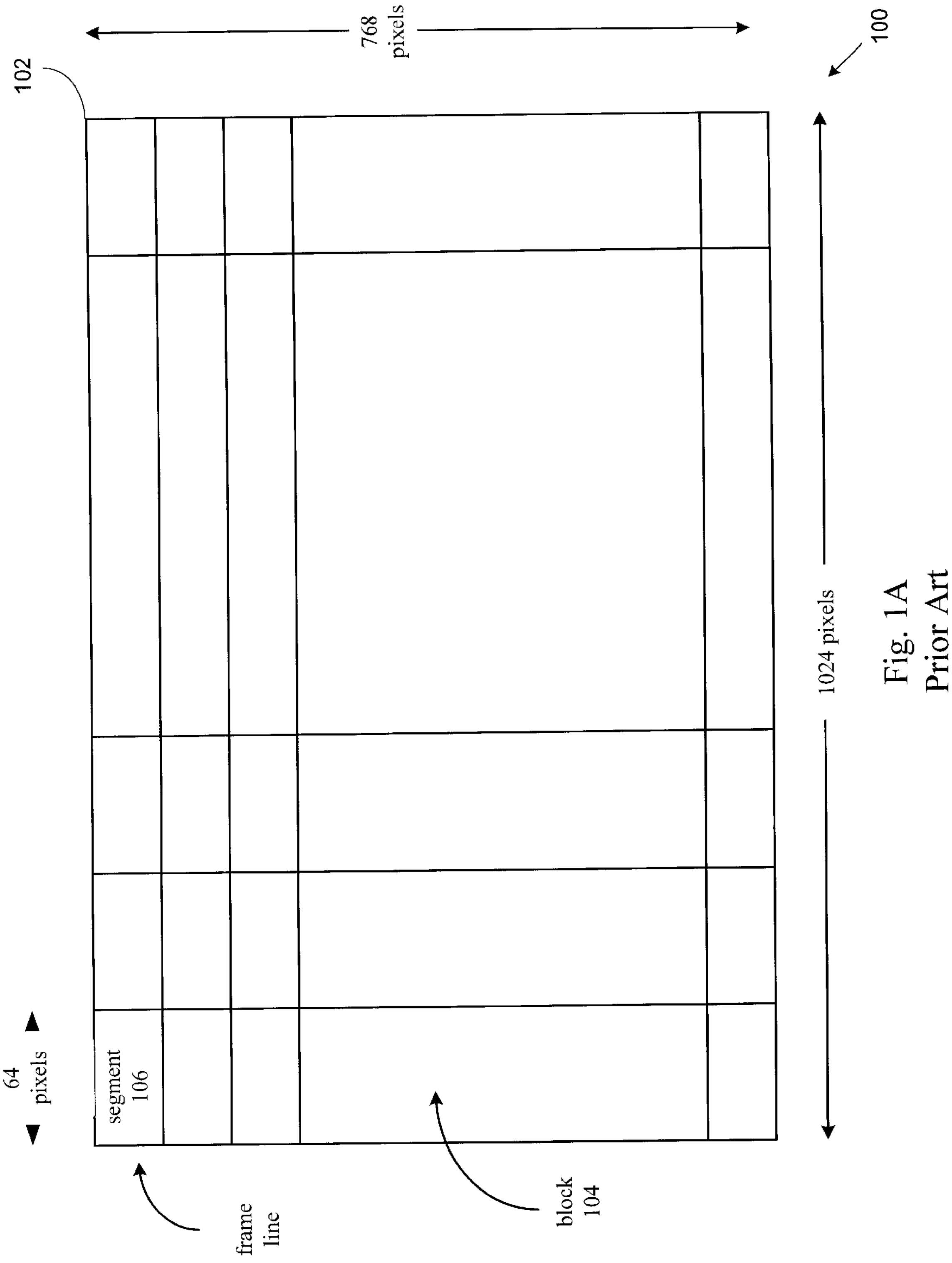
Fig. 1A Prior Art
FIG. 1A shows a conventional approach to detecting flicker in an image to be displayed on an LCD flat panel screen.
Figure 1B:
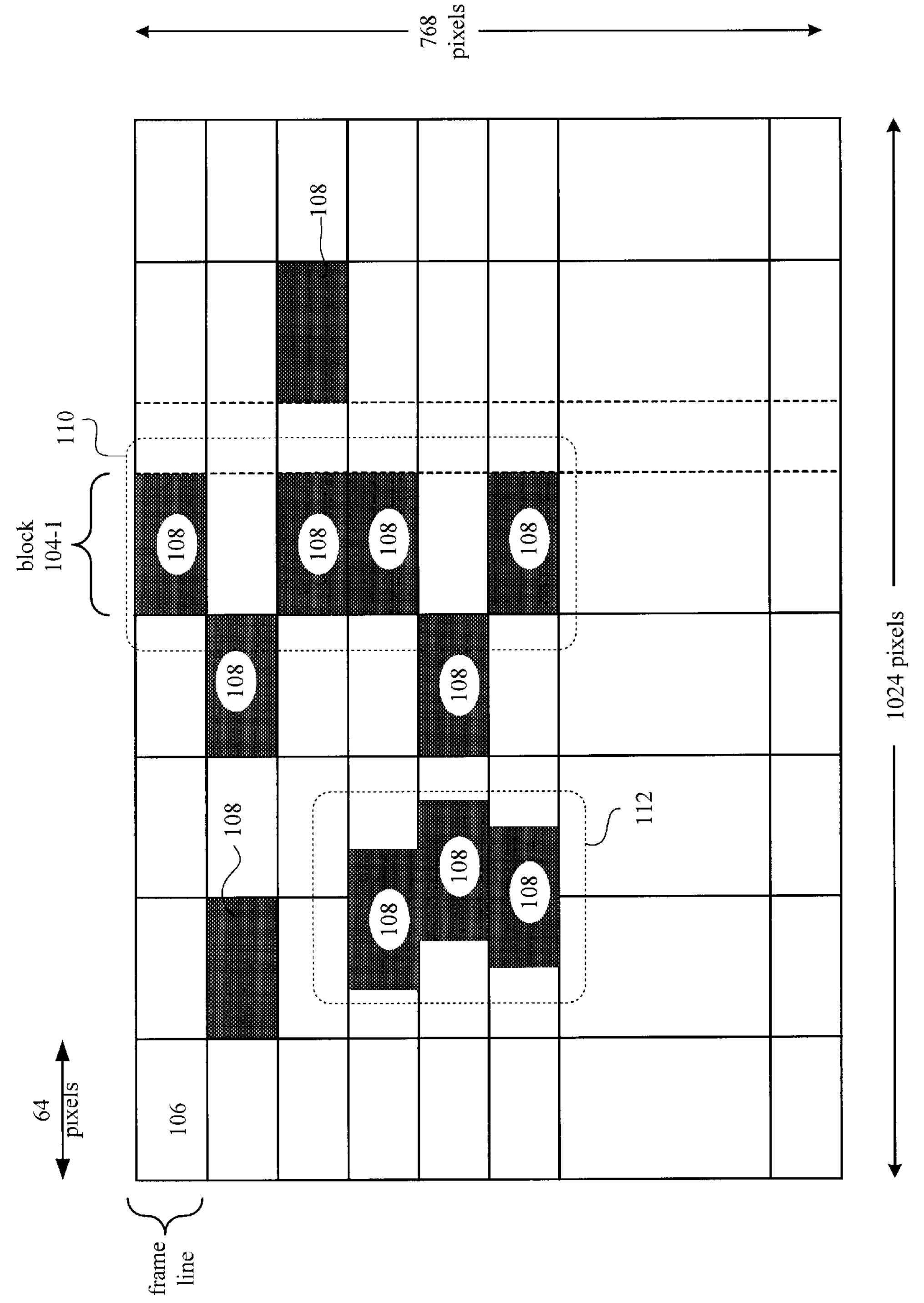
Fig. 1B Prior Art
FIG. 1B shows the flat panel screen of FIG. 1A having a number of segments identified as bad segments.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In one embodiment, a flicker pattern detector coupled to a video signal source suitable for detecting a sub-pixel pair susceptible to producing a flicker event in an image displayed on a liquid crystal display (LCD) unit is described. The flicker pattern detector includes a two dimensional flicker pattern analyzer arranged to perform a two dimensional flicker pattern analysis on a selected group of sub-pixels some of which are included in a first plurality of sub-pixels that includes a first current sub-pixel and a first next sub-pixel included in a first video frameline and a remainder of which are included in a second plurality of sub-pixels included in a second video frameline that is received, in real time, from the video signal source that includes a second current sub-pixel and a second next sub-pixel. The two dimensional flicker pattern analyzer includes a first storage device suitable for storing the first plurality of sub-pixels, a second storage device coupled to the first storage device suitably arranged to store the first current sub-pixel, a third storage device arranged to store a the second current sub-pixel, and a comparator unit coupled to the first storage device, the second storage device and the third storage device. The comparator unit is arranged to perform a two dimensional compare operation, and update a final flicker frame score based upon the compare operation indicative of the susceptibility of producing a flicker event in an image displayed on a liquid crystal display (LCD) unit.

In a preferred embodiment, the flicker detector also includes a one dimensional flicker pattern analyzer arranged to perform a one dimensional flicker pattern analysis on a previous sub-pixel and a current sub-pixel that includes a fourth storage device suitable for storing the previous sub-pixel, a second comparator unit coupled to the fourth storage device arranged to compare the previous sub-pixel and a current sub-pixel received in real time from the video signal source and based upon the compare, updates the final flicker frame score.

One of the advantages of the inventive flicker detector unit is the capability of performing a two dimensional flicker pattern search using the line buffer or a one-dimensional flicker pattern search using the flip flop, or any combination thereof.

The invention will now be described in terms of a flicker detection unit and methods thereof capable of being incorporated in an integrated semiconductor device well known to those skilled in the art. It should be noted, however, that the described embodiments are for illustrative purposes only and should not be construed as limiting either the scope or intent of the invention.

Figure 2:
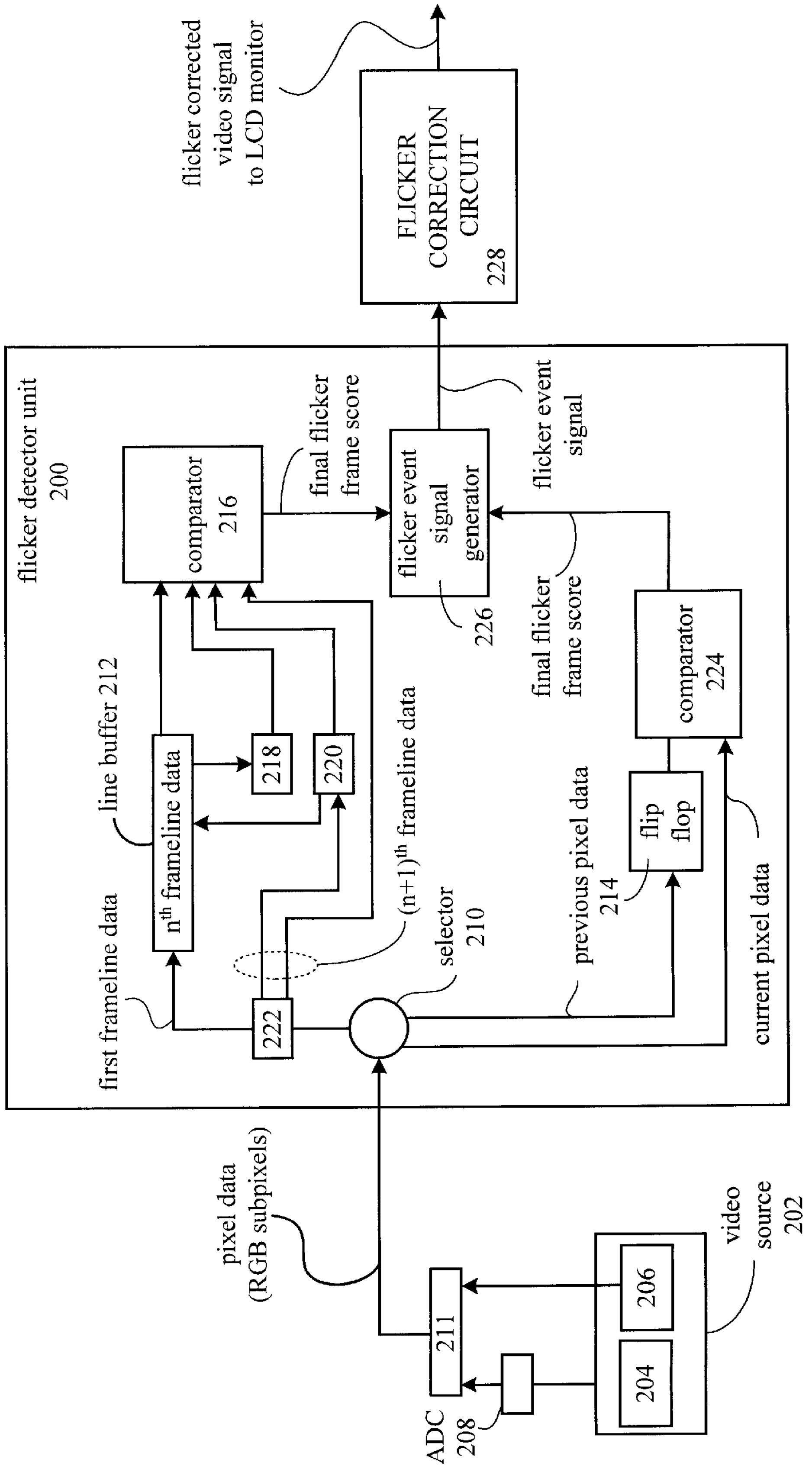
FIG. 2 shows a flicker detection circuit in accordance with an embodiment of the invention.

Accordingly, FIG. 2 shows a flicker detection unit 200 in accordance with an embodiment of the invention. It should be noted that the flicker detection unit 200 can be implemented in any number of ways, such as a integrated circuit, a preprocessor, or as programming code suitable for execution by a processor such as a central processing unit (CPU) and the like. In the embodiment described, the flicker detection unit 200 is typically part of an input system, circuit, or software suitable for pre-processing video signals derived from a video source 202. It should be noted that these video signals can have any number and type of well-known formats, such as BNC composite, serial digital, parallel digital, RGB, or consumer digital video. The signal can be analog provided the video source 202 includes, analog image source 204 such as for example, an analog still camera, analog VCR, DVD player, camcorder, laser disk player, TV tuner, settop box (with satellite DSS or cable signal) and the like. The video source 202 can also include a digital visual interface (DVI 206). The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the image source 202 provides an analog image signal, an analog-to-digital converter (A/D) 208 is connected to the analog image source 204. In the described embodiment, the A/D converter 208 converts an analog voltage or current signal into a discrete series of digitally encoded numbers (signal) forming in the process an appropriate digital image data word suitable for digital processing. Any of a wide variety of A/D converters can be used. By way of example, various A/D converters include those manufactured by: Philips, Texas Instrument, Analog Devices, Brooktree, and others.

Figure 3:
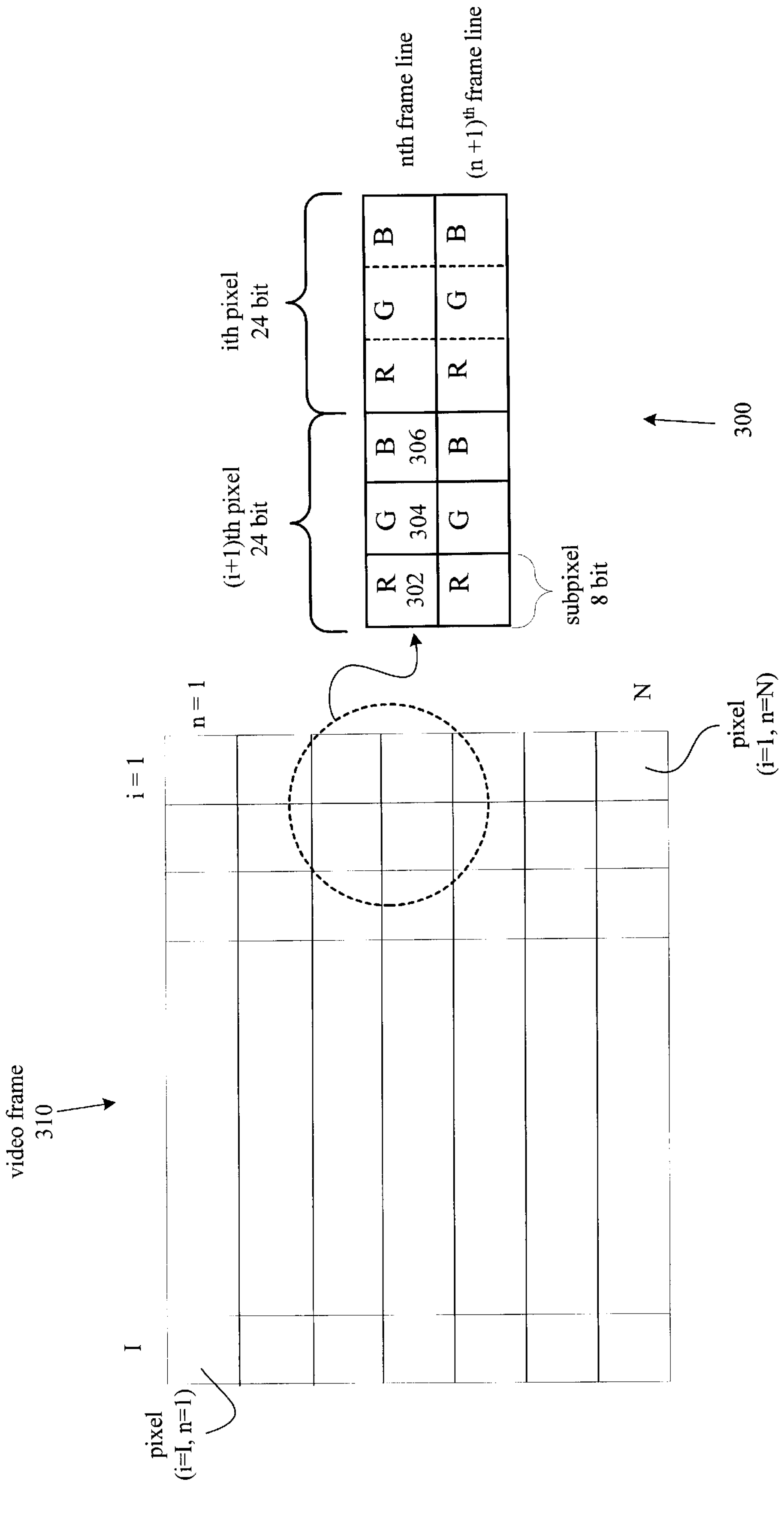
FIG. 3 shows a representative pixel data word in accordance with the invention is shown suitable for an RGB based 24 bit (or true color) system.

Referring to FIG. 3, a representative pixel data word 300 in accordance with the invention is shown suitable for an RGB based 24 bit (or true color) system. It should be noted, however, that although an RGB based system is used in the subsequent discussion, the invention is well suited for any appropriate color space. Accordingly, the pixel data word 300 is formed of 3 sub-pixels, a Red (R) sub-pixel 302, a Green (G) sub-pixel 304, and a Blue (B) sub-pixel 306 each sub-pixel being 8 bits long for a total of 24 bits. In this way, each sub-pixel is capable of generating $2^8$ (i.e., 256) voltage levels (sometimes referred to as bins when represented as a histogram). For example, the B sub-pixel 306 can be used to represent 256 levels of the color blue by varying the transparency of the liquid crystal which modulates the amount of light passing through the associated blue mask whereas the G sub-pixel 304 can be used to represent 256 levels of the color green in substantially the same manner. It is for this reason that conventionally configured display monitors are structured in such a way that each display pixel is formed in fact of the 3 sub-pixels 302–306 which taken together form approximately 16 million displayable colors. Using an active matrix display, for example, a video frame 310 having N framelines each of which is formed of I pixels, a particular pixel data word can be identified by denoting a frameline number n (from 1 to N) and a pixel number i (from 1 to I).

Referring back to FIG. 2, a video signal selector 210 connected to the digital visual interface 206 and the A/D converter 208 by way of a mux 211 is arranged provide the pixel data from the ADC 208 to a first storage device such as a line buffer 212 or, if the line buffer 212 is unavailable or not necessary, to a second storage device such as a flip flop 214. It should be noted that the line buffer 212 is arranged to store at least one frameline of pixel data at a time whereas the flip-flop 214 typically stores a single pixel (or sub-pixel) data word. In the described embodiment, the line buffer 212 is coupled to a first comparator unit 216 arranged to receive pixel (or sub-pixel) data directly from the line buffer 212 as well as a first latch 218 and a second latch 220. In a preferred embodiment, the first comparator 216 can also receive, in real time, pixel data from a multiplexor unit 222. The flicker detector unit 200 also includes a second comparator 224 arranged to receive pixel data stored in the flip flop 214 as well as, in real time, pixel data directly from the selector 210.

It should be noted that either one or the other of either the line buffer 212 or the flip flop 214 can be included in the flicker detector unit 200 depending upon the anticipated applications for which the flicker detector unit 200 will be used. For example, in some cases, the flicker detector unit 200 will only include the line buffer unit 212 whereas in other cases, the flicker detector unit 200 will include only the flip flop 214. In any case, either or both of the first comparator 216 and the second comparator 224 are connected to a flicker event signal generator unit 226 arranged to provide a flicker event signal based upon a final flicker frame score provided by the comparators 216 and 224. Typically, the flicker event signal is used by a flicker correction circuit 228 that provides appropriate flicker correction algorithms or other appropriate flicker correction techniques to the video signal prior to being used to drive an LCD monitor (not shown) coupled thereto.

Figure 4:
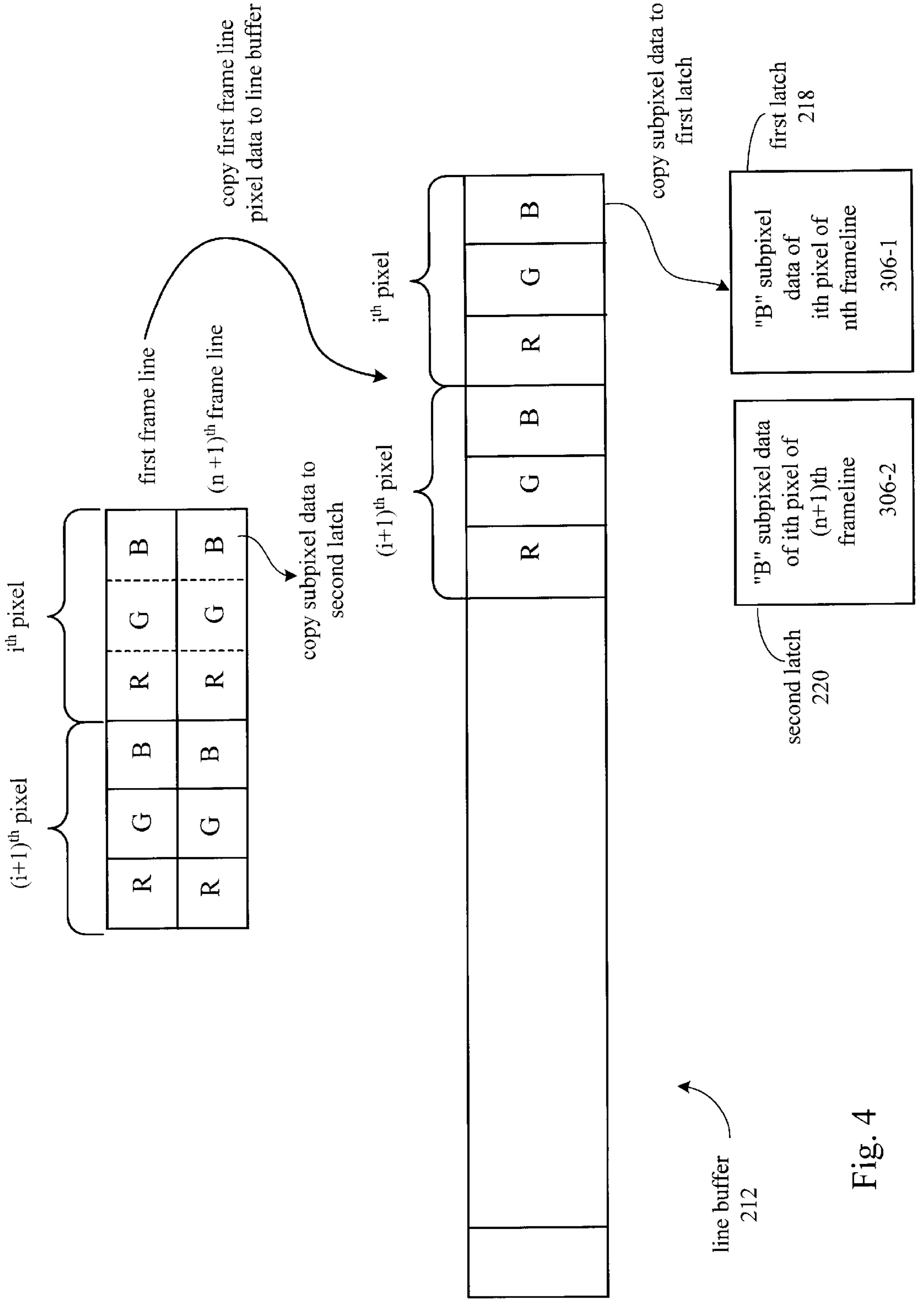
FIG. 4 illustrates transfer of pixel data between the line buffer and latches in accordance with an embodiment of the invention.

For sake of simplicity, the operation of the flicker detector unit 200 will be described with reference to FIGS. 2–7. During operation of the flicker detector unit 200, a digital video signal in the form of a number of associated pixel data words 300 and their associated sub-pixels 302–308 (i.e. a frameline) are received at the selector unit 210. In the case where the line buffer 212 is to be used (i.e., a two dimensional flicker pattern search), substantially all the pixel data associated with the first frameline is directly stored in the line buffer 212. This is graphically illustrated in FIG. 4 showing the pixels (and their associated subpixels) that form the first frameline of the video frame 310 stored in the line buffer 212. Once the appropriate pixel data is stored in the line buffer 212, a first sub-pixel data word 306-1 (line buffer current pixel) is copied from the line buffer 212 to the first latch 218 while a corresponding second sub-pixel data word 306-2 (current pixel) associated with a current frameline is, in real time, stored in the second latch 220 (again illustrated in FIG. 4). Once the appropriate sub-pixel data is stored in the first and the second latches 218 and 220, the comparator unit 216 performs a two dimensional (i.e., four way) sub-pixel comparison between the sub-pixel data stored in the first latch 218, the second latch 220, as well as corresponding sub-pixel data from a line buffer next pixel stored in the line buffer 212 and a next pixel retrieved in real time by the selector 210.

As described above, flicker is due primarily to the fact that the amount of light permeating the liquid crystal material in the odd frames and that of light permeating the liquid crystal material in the even frames is different. In order, however, to identify those sub-pixel pairs having the greatest likelihood of exhibiting flicker (i.e., a worst case scenario), the inventive flicker detector unit 200 relies upon the fact that the voltage-transparency characteristics of the liquid crystal is substantially "S" shaped (see FIG. 6). Since the pixel at the middle of the signal voltage range (i.e., V=128) is more sensitive to any signal voltage change than are those at either end of the voltage range, those sub-pixel pairs exhibiting a voltage pattern of $\{0, 128, 0, 128\}$ out of a range of $\{0, 256\}$ are considered worst case with regards to flicker (due to the comparatively large difference in Δtransparency/Δvoltage for the sub-pixel pair). Accordingly, with respect to the remainder of this discussion, this pattern is referred to as a half tone pattern, or half flicker tone, where a full tone is the full range of 256. When the selected flicker condition has been met, that sub-pixel pair is considered to be a bad pixel pair (i.e., susceptible to flicker) to which the comparator 216 responds by incrementing a flicker count.

Figure 5A:
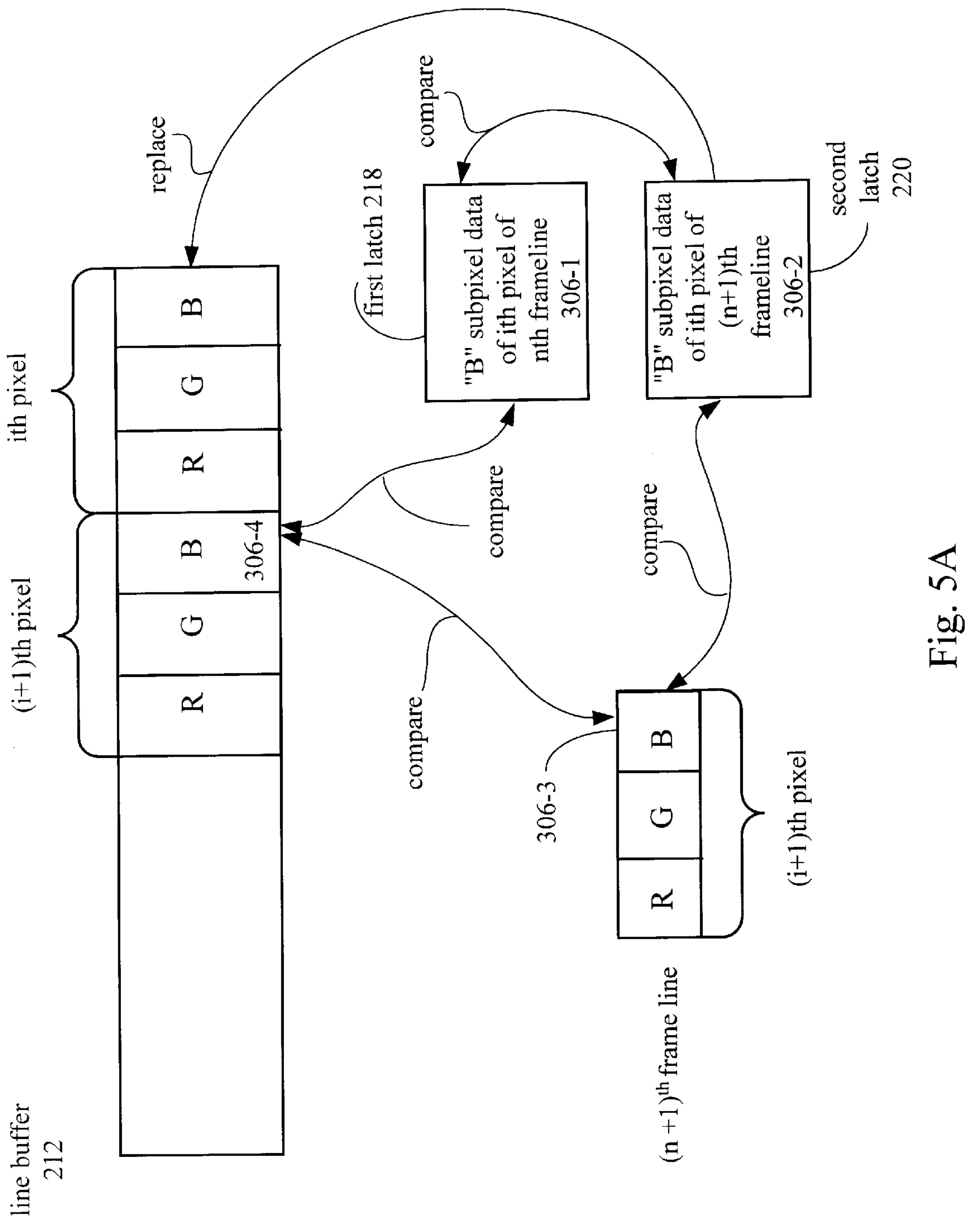
FIGS. 5A–5B illustrate sub-pixel compare operations in accordance with an embodiment of the invention.
Figure 5B:
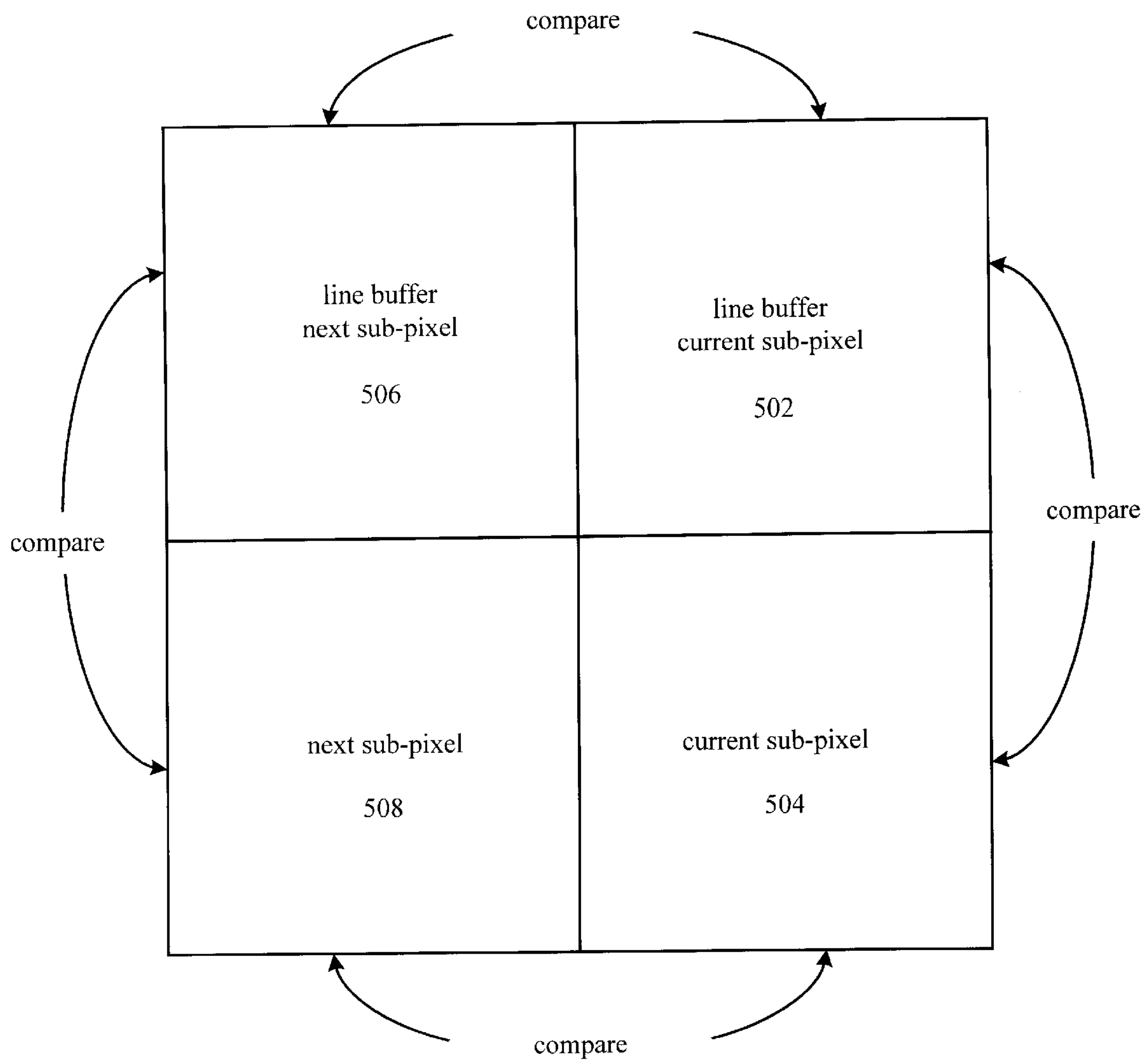
Figure 6:
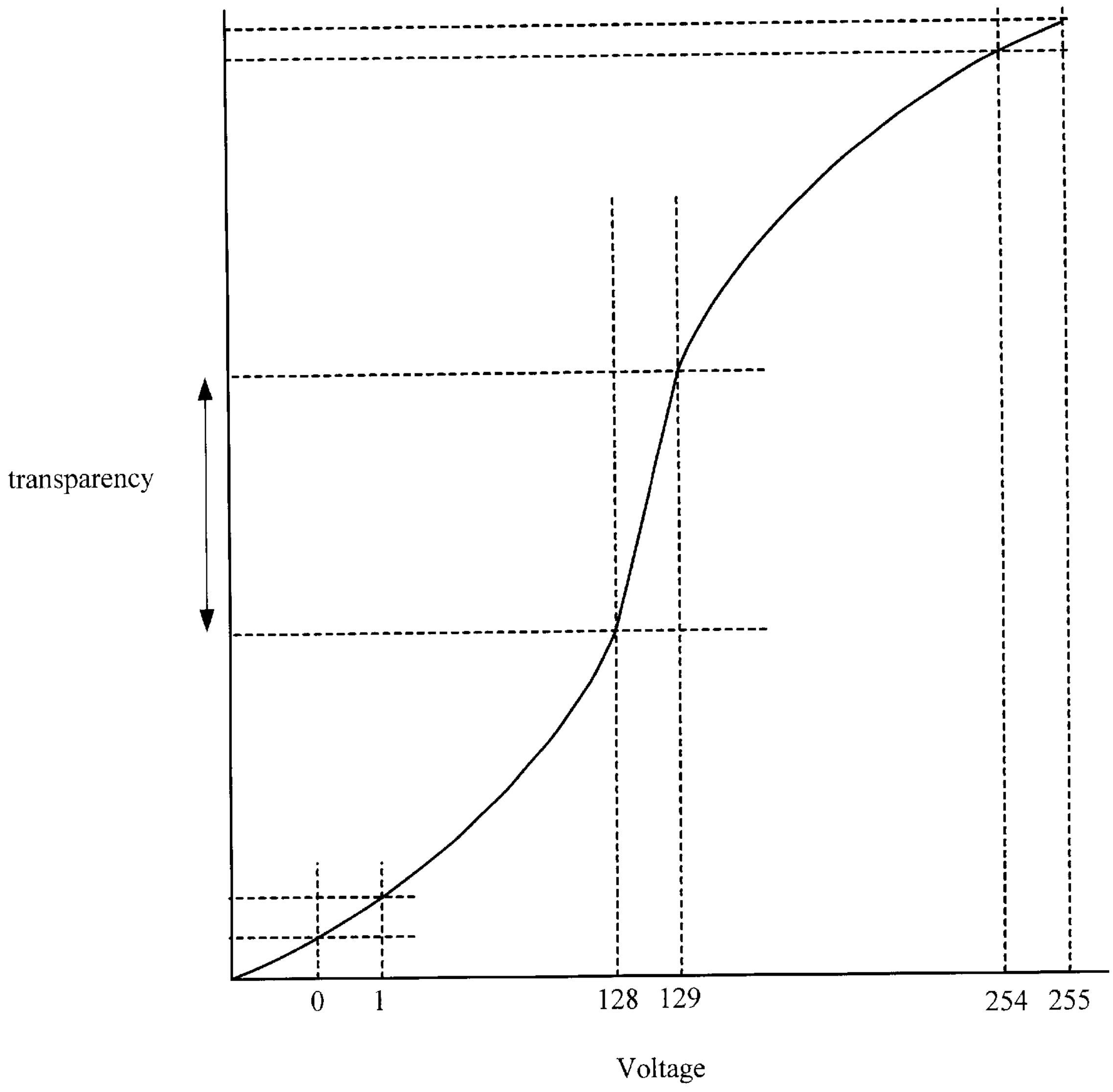
FIG. 6 shows a transparency vs. voltage curve for a representative LC pixel in accordance with an embodiment of the invention.

These compare operations are graphically illustrated in FIGS. 5A and 5B showing the example of the B sub-pixel 306-1 of the first frameline stored in the first latch 218, the B sub-pixel 306-2 of the next frameline stored in the second latch 220 compared with a next sub-pixel 306-3 and a next line buffer pixel 306-4. Shown in FIG. 5B in general terms, a comparison is performed between a current line buffer sub-pixel 502 and a current pixel 504, the current line buffer sub-pixel 502 and a next line buffer sub-pixel 506, the current sub-pixel 504 and a next sub-pixel 508, and finally the next sub-pixel 508 and the next line buffer sub-pixel 506. In this way, a two dimensional flicker detection is performed for all sub-pixels in both the first and the second frameline.

It should also be noted, that for sake of efficiency, once the comparison operations are complete for a particular sub-pixel, the contents of the second latch 220 replace the content of the location of the line buffer 212 from whence the contents of the first latch 218 originated. In this way, the line buffer 212 is continuously refreshed with next frameline pixel data.

In those situations where a two dimensional flicker search is not undertaken, the flicker detector unit 212 utilizes a one dimensional flicker pattern search using the flip flop 214 in which is stored a previous sub-pixel data. Again, using the same criteria for determining a worst case sub-pixel pair comparison as is done with the two dimensional flicker pattern search, the comparator 224 compares the previous sub-pixel data with a current sub-pixel data in real time. Again, based upon the comparison, the comparator 224 will update (or not) the flicker count. In the cases where the flicker count equals or exceeds a pre-set flicker count threshold, a flicker frame number is incremented indicating that that particular frame is characterized as a flicker frame Once all the pixels of a particular frame have been processed, and all, or a preset number of frames analyzed, the flicker event signal generator 226 will set or reset a flicker event signal based upon a pre-determined (and programmable) flicker count number threshold. In those cases where the flicker count threshold has been reached, the flicker event signal generator 226 sets the flicker event signal which is sent to the flicker correction unit 228 that responds by providing an appropriate flicker correction signal to the LCD monitor (not shown).

Figure 7:
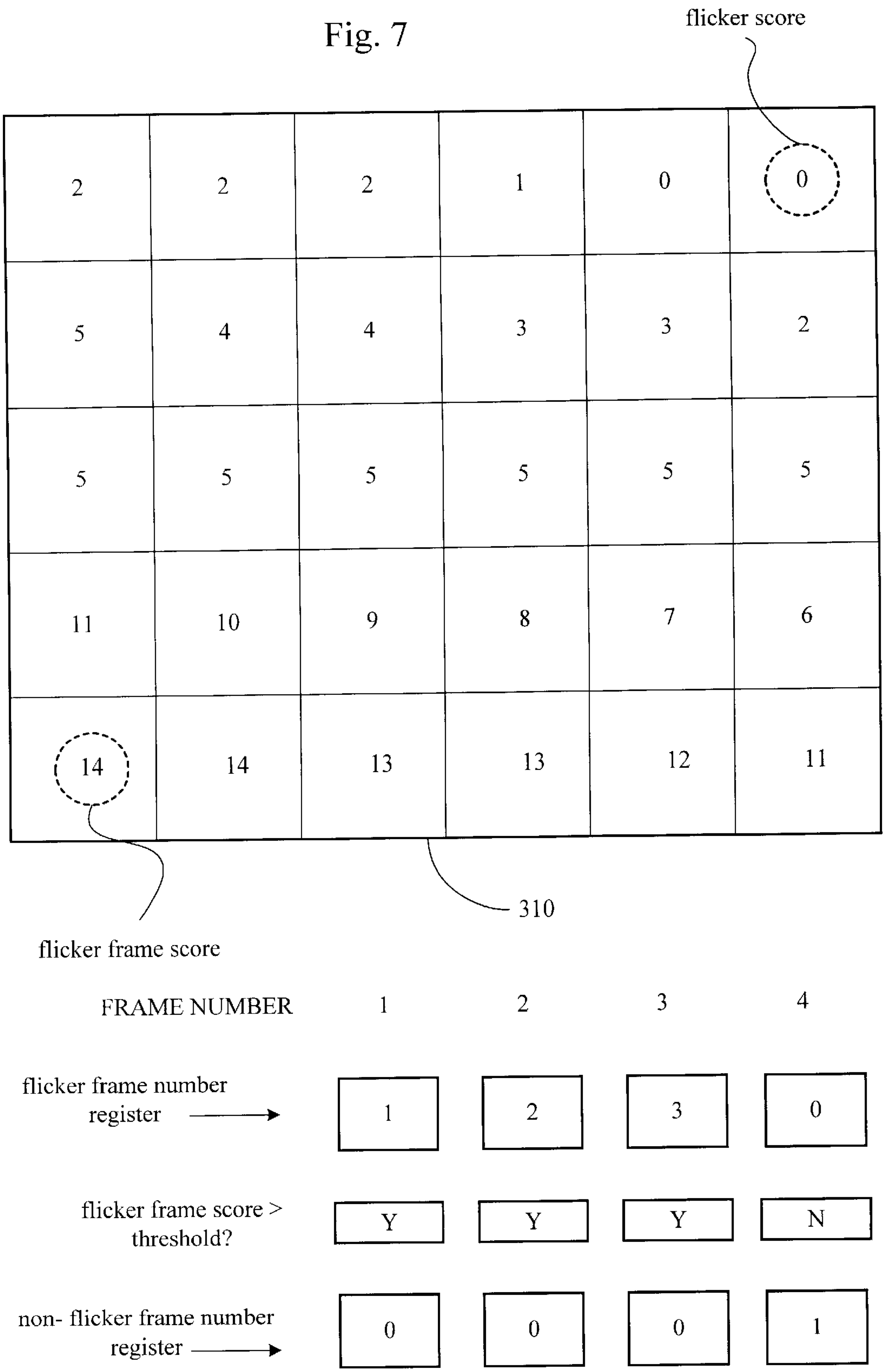
FIG. 7 illustrates an exemplary flicker score pattern 600 for the frame 310 in accordance with an embodiment of the invention.

FIG. 7 illustrates an exemplary flicker score pattern 600 for the frame 310 in accordance with an embodiment of the invention. Accordingly, each sub-pixel comparison performed by the comparators 216 or 214 results a setting of a corresponding flicker score if at least one sub-pixel pair is determined to violate a predetermined flicker threshold. It should be noted, however, that whenever a particular sub-pixel comparison is made, the corresponding flicker frame score is incremented, or not, based on whether or not the flicker score has been set which is, in turn, based upon the flicker threshold having been reached or not. For example, in FIG. 7, a flicker score (1,1) is set equal to zero indicating that none of the sub-pixel comparisons associated with location (1,1) violated the flicker threshold and the corresponding flicker frame score (1,1) remained set to zero. A next set of sub-pixel comparisons at (1,2) also resulting in no violation of the flicker threshold, so the corresponding flicker frame score (1,2) remained set at zero. However, at a third set of comparisons at (1,3), at least one of the sub-pixel comparisons resulted in a violation of the flicker threshold resulting in a flicker frame score (1,3) being set to one ("1"). Therefore, the flicker frame score is only incremented when any of the corresponding sub-pixel comparisons violate the flicker threshold. This process continues until the entire frame 310 has been analyzed with a resulting final flicker frame score of fourteen ("14").

At this point, the final flicker frame score is compared to a flicker frame score threshold which determines whether or not the associated frame is a flicker frame or not. If, as in the case shown in FIG. 7, the frame 310 is a flicker frame, a flicker frame number is updated to, in this case, "1". A next frame is then analyzed, its final flicker frame score is compared to the flicker frame score threshold and the flicker frame number in a flicker frame number register is updated accordingly. In the example shown in FIG. 7, the first three frames have been characterized as flicker frames and the flicker frame number has been incremented accordingly. However, since the fourth frame has been characterized as a non-flicker frame, the flicker frame number is reset to zero and the non-flicker frame number is set to one. This process continues for all frames (or a number of predetermined frames) and based upon the values of the flicker frame number and the non-flicker frame number, a flicker event signal is generated (or not).

FIGS. 8–11 are flowcharts detailing a process 700 for detecting flicker in a image in accordance with an embodiment of the invention. It should be noted that with regards to describing the process 700, a video frame having N framelines each of which includes I pixels is used.

Figure 8:
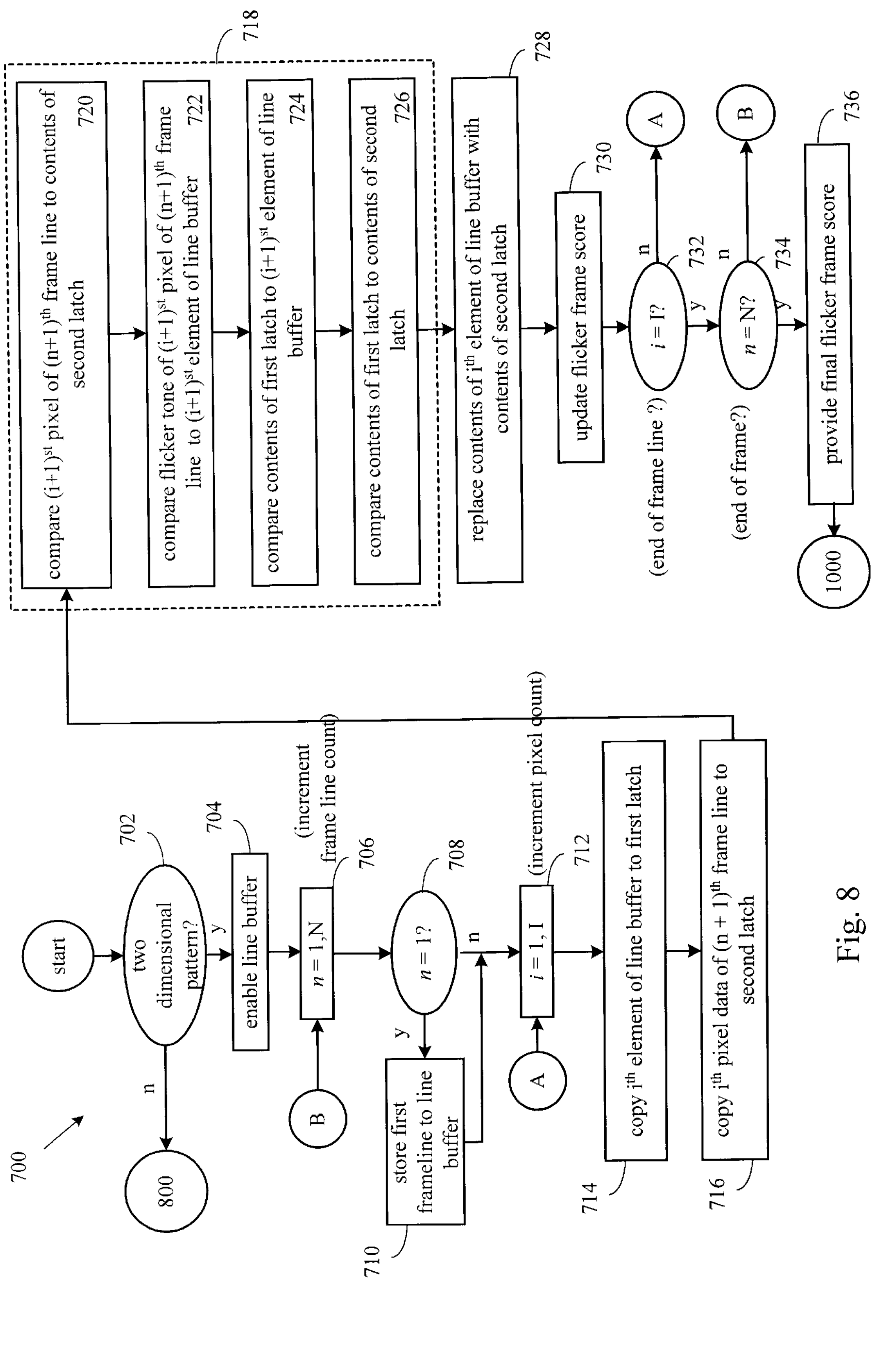
FIG. 8 shows a flowchart detailing a process for detecting a two dimensional flicker pattern in accordance with an embodiment of the invention.

Accordingly, FIG. 8 shows a flowchart detailing a process 700 for detecting a two dimensional flicker pattern in accordance with an embodiment of the invention. The process 700 starts at 702 by determining whether or not a two dimensional search is to be performed. If it is determined that a two dimensional search is not to be performed then control is passed to a one dimensional search 800 described below with reference to FIG. 9, otherwise, a line buffer having a width capable of accommodating (3×I) sub-pixels is enabled at 704. Next, at 706 a frameline count n is recursively incremented from 1 to N after which a determination is made at 708 if the frameline count n is 1 (indicative of the first frameline). If the frameline count n is 1, then the sub-pixel data corresponding to the first frameline is stored in the line buffer at 710, otherwise, a sub-pixel count i is recursively incremented from 1 to I at 712. During each loop of the sub-pixel count recursion, the contents of an $i^{th}$ element of the line buffer (i.e., the line buffer current sub-pixel) is copied to a first latch at 714 substantially simultaneously with the contents of an $i^{th}$ sub-pixel data of an $(n+1)^{th}$ frameline (i.e., the current sub-pixel) being copied to a second latch at 716.

Next, at 718, a two dimensional flicker pattern search is conducted that in the described embodiment is formed of a four way sub-pixel comparison described in 720–726. More specifically, at 720, the $(i+1)^{st}$ sub-pixel of $(n+1)^{th}$ frameline is compared to the contents of second latch (i.e., the next sub-pixel is compared to the current sub-pixel). At 722, the $(i+1)^{st}$ pixel of $(n+1)^{th}$ frameline is compared to the $(i+1)^{st}$ element of the line buffer (i.e., the next sub-pixel is compared to line buffer previous sub-pixel). At 724, the contents of first latch is compared to the $(i+1)^{st}$ element of the line buffer (i.e., line buffer current sub-pixel is compared to the line buffer next sub-pixel). At 726, the contents of the first latch is compared to the contents of second latch (i.e., the line buffer current sub-pixel is compared to the current sub-pixel).

It should be noted that the two dimensional flicker pattern search is conducted for all sub-pixels associated with a particular pixel. Therefore, in the exemplary RGB system, each pixel undergoes a total of at least 12 comparison operations, 4 for each R, G, B sub-pixel. After the two dimensional flicker pattern search 718 has been completed for each sub-pixel pair, the contents of the $i^{th}$ element of the line buffer is replaced by the contents of the second latch at 728 thereby updating the line buffer with the current sub-pixel data. Next, at 730, a flicker score is updated based upon the comparison 718 while at 732, a determination is made whether or not the end of the frameline has been reached. If the end of the frameline has not been reached, then control is passed to 712 where the pixel count is incremented, otherwise a determination is made at 734 whether or not the end of the frame has been reached. If the end of the frame has not been reached, then control is passed back to 706 where the frameline count is incremented, otherwise a final flicker frame score is provided at 736.

Figure 9:
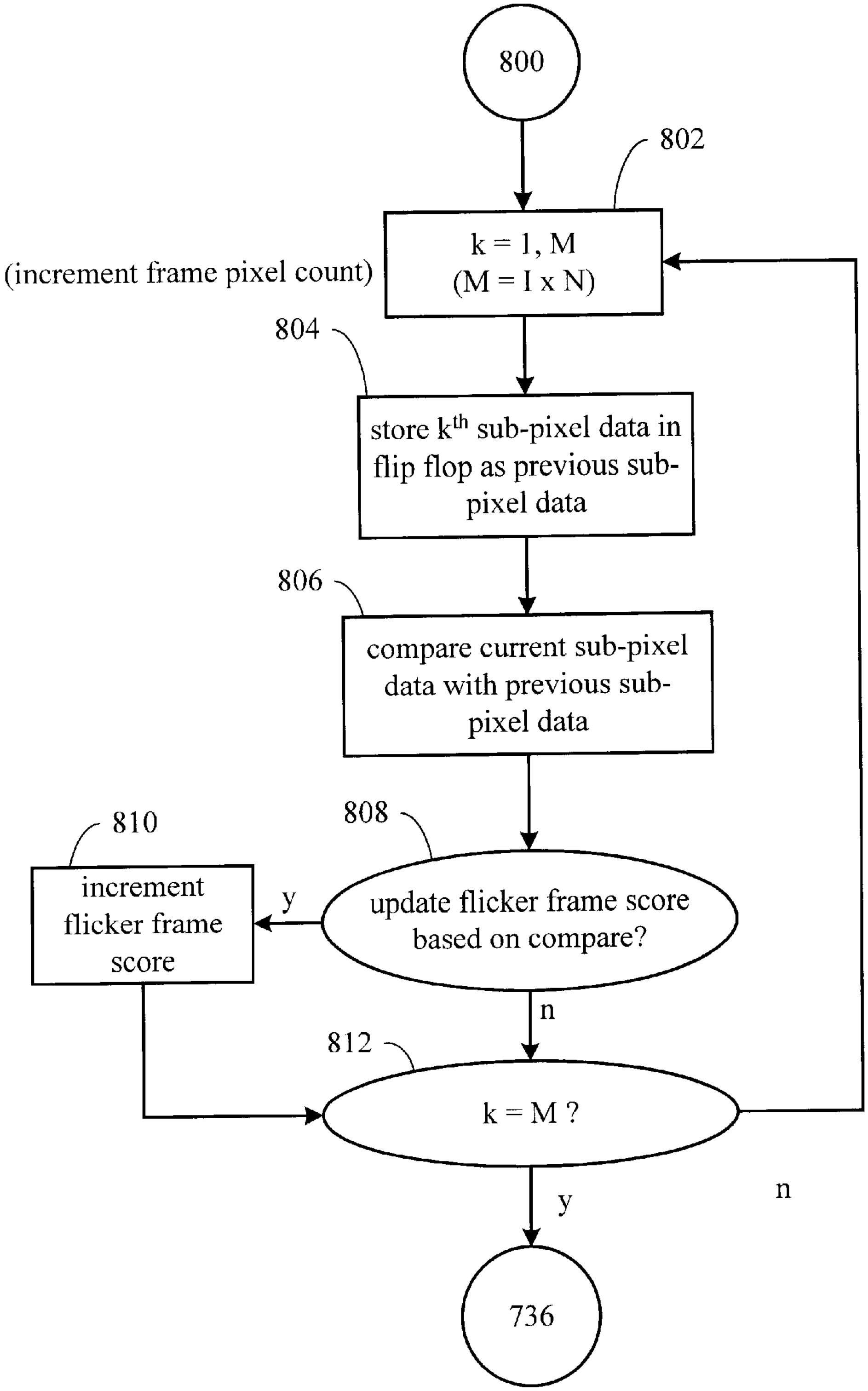
FIG. 9 shows a flowchart detailing a process for detecting a one dimensional flicker pattern in accordance with an embodiment of the invention.

Returning back to 702, if it had been determined that a one dimensional flicker pattern search is to be performed, then control is passed to process 800 described with reference to FIG. 9. Accordingly, at 802 a frame sub-pixel counter k is incremented starting at a first pixel where the frame sub-pixel counter identifies all sub-pixels in a particular frame having N framelines each of which includes I pixels. In the case of, for example, an RGB system where each pixel includes 3 sub-pixels, the frame sub-pixel counter has a maximum value of M which is equal to (3×I×N). Next, at 804, a kth sub-pixel is stored in a storage circuit, such as a flip flop as a previous sub-pixel while at 806 a (k+1) sub-pixel is compared in real time as a current pixel to the previous sub-pixel by a comparator unit. At 808, a determination is made whether or not a flicker frame score is to be updated based upon the compare. If the flicker frame score is to be updated, then the flicker frame score is updated at 810, otherwise the otherwise control is passed directly to 812 where it is determined if the sub-pixel count is equal to M signifying that the current sub-pixel is the last sub-pixel included in the frame. If the current sub-pixel is the last sub-pixel, then control is passed to 736 of the process 700, otherwise, the frame pixel counter is updated at 802.

Figure 10:
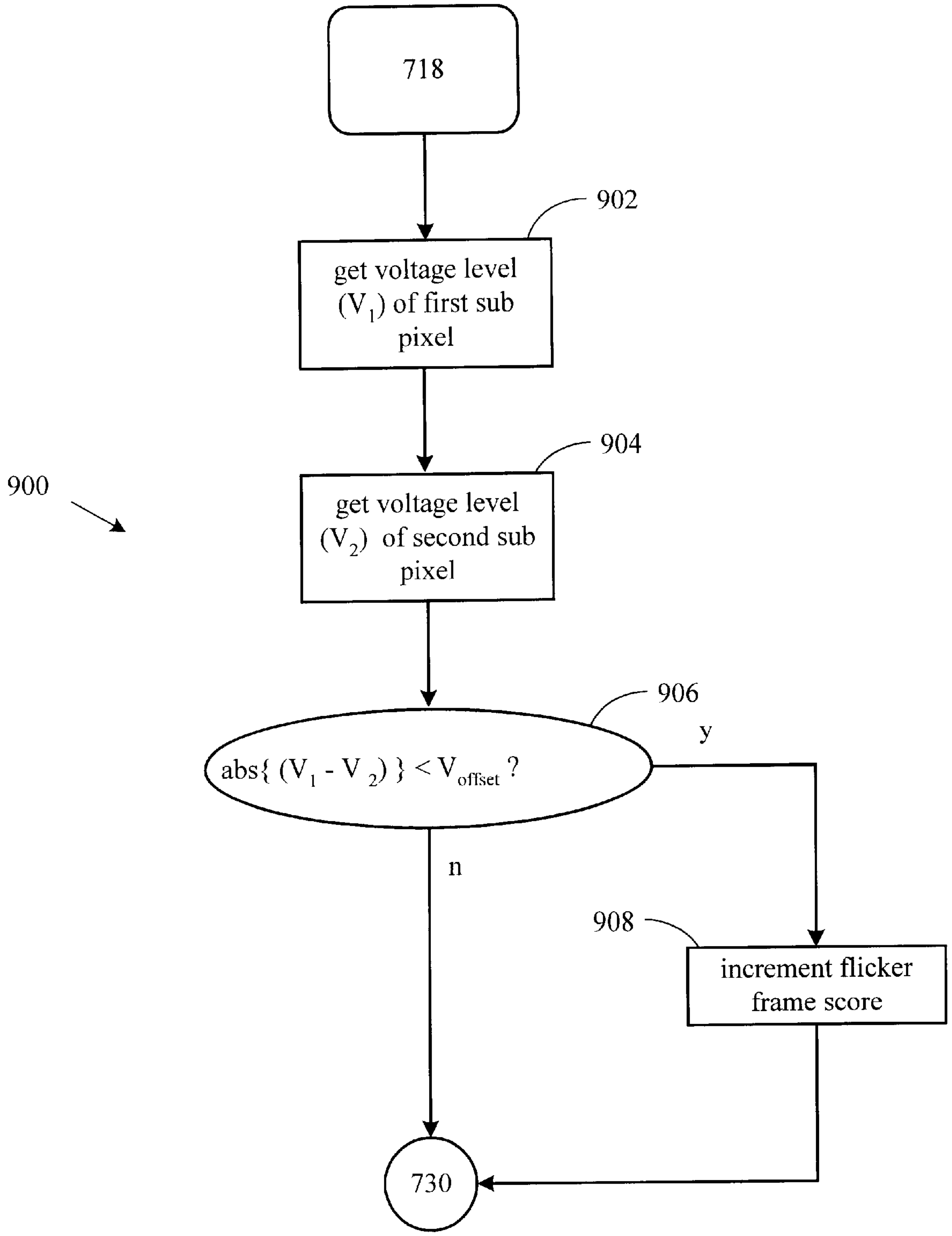
FIG. 10 shows a flowchart detailing a sub-pixel compare process in accordance with an embodiment of the invention.

FIG. 10 shows a flowchart detailing a process 900 being one embodiment of the sub-pixel compare process 718. Accordingly, the process 900 begins at 902 by retrieving a voltage level (v1) for a first sub-pixel. Next, at 904, a voltage level v2 is retrieved for a second sub-pixel. At 906, in the described embodiment, an evaluation of the susceptibility of the sub-pixel pair to exhibit flicker is based upon the results of condition (1):

$(1) ABS\{(V2-V1)\}$<=flicker offset.

It should be noted that the flicker offset is related to flicker sensitivity of particular LCD monitors and can be set accordingly.

If the condition (1) has been met, then the flicker score is set and control is passed back to 730 of the process 700, otherwise, control is passed directly back to 730 to the process 700 without setting the flicker score.

Figure 11:
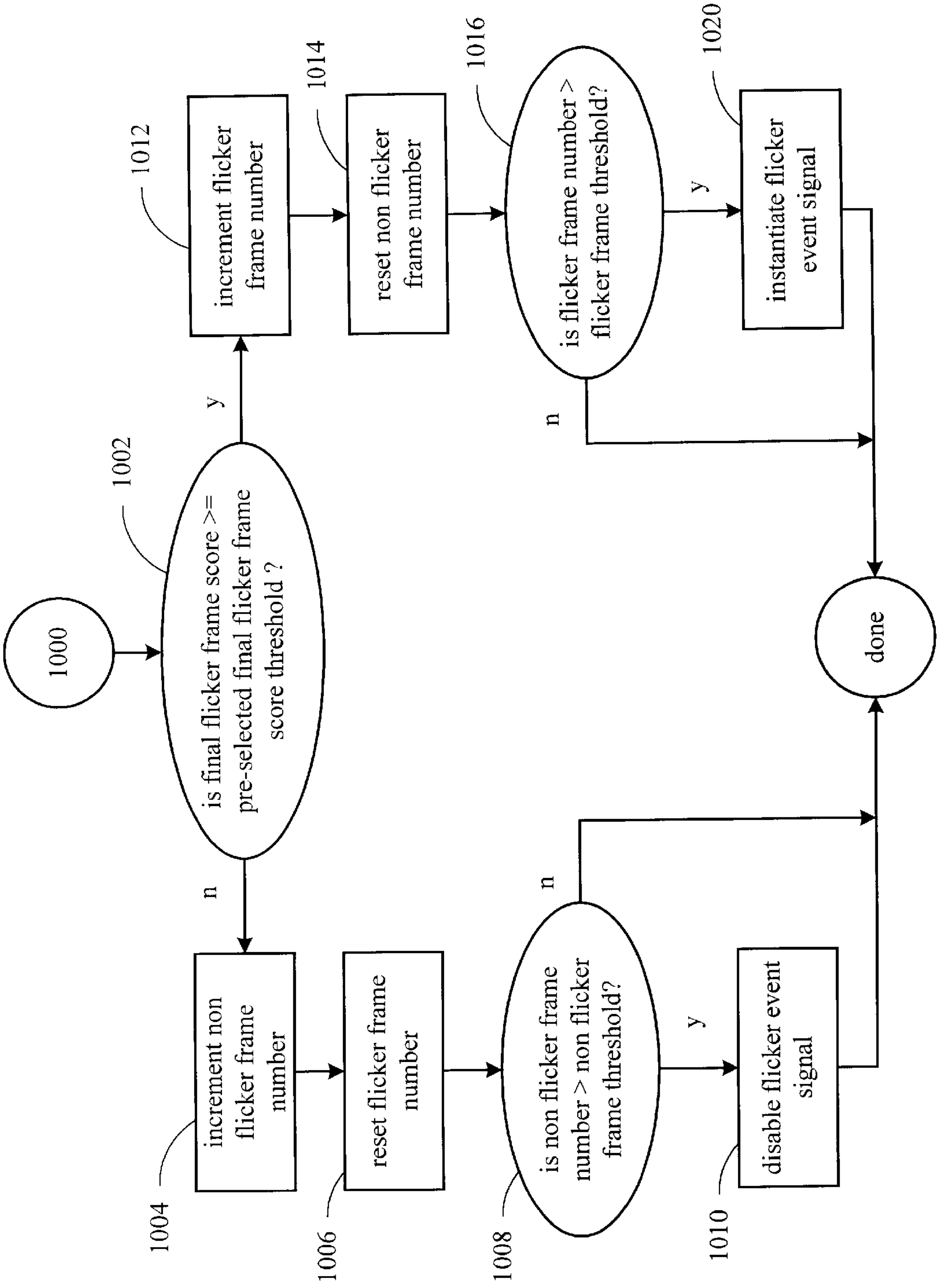
FIG. 11 shows a flowchart detailing a process for generating a flicker event signal used for correcting detected flicker patterns in accordance with an embodiment of the invention.

FIG. 11 shows a flowchart detailing a process 1000 for generating a flicker event signal used for correcting detected flicker patterns in accordance with an embodiment of the invention. The process 1000 begins at 1002 where a determination is made whether of not a final flicker frame score is greater than or equal to a pre-selected flicker frame score threshold. If it is determined that the flicker frame score threshold has not been reached or exceeded, a non-flicker frame number is incremented at 1004 and at 1006, a flicker frame number is reset to zero. At 1008, a determination is made whether or not the non-flicker frame number is greater than a non-flicker frame threshold. If the non-flicker frame threshold has been reached, then the flicker event signal is disabled at 1010, otherwise processing stops.

Returning to 1002, if, however, it had been determined that the final flicker frame score threshold had been reached or exceeded, the flicker frame number is incremented at 1012 and the non-flicker frame number is reset to zero at 1014. At 1016, a determination is made whether or not the flicker frame number is greater than a flicker frame threshold. If the flicker frame threshold has been exceeded, then the flicker event signal is enabled at 1018, otherwise processing stops.

Figure 12:
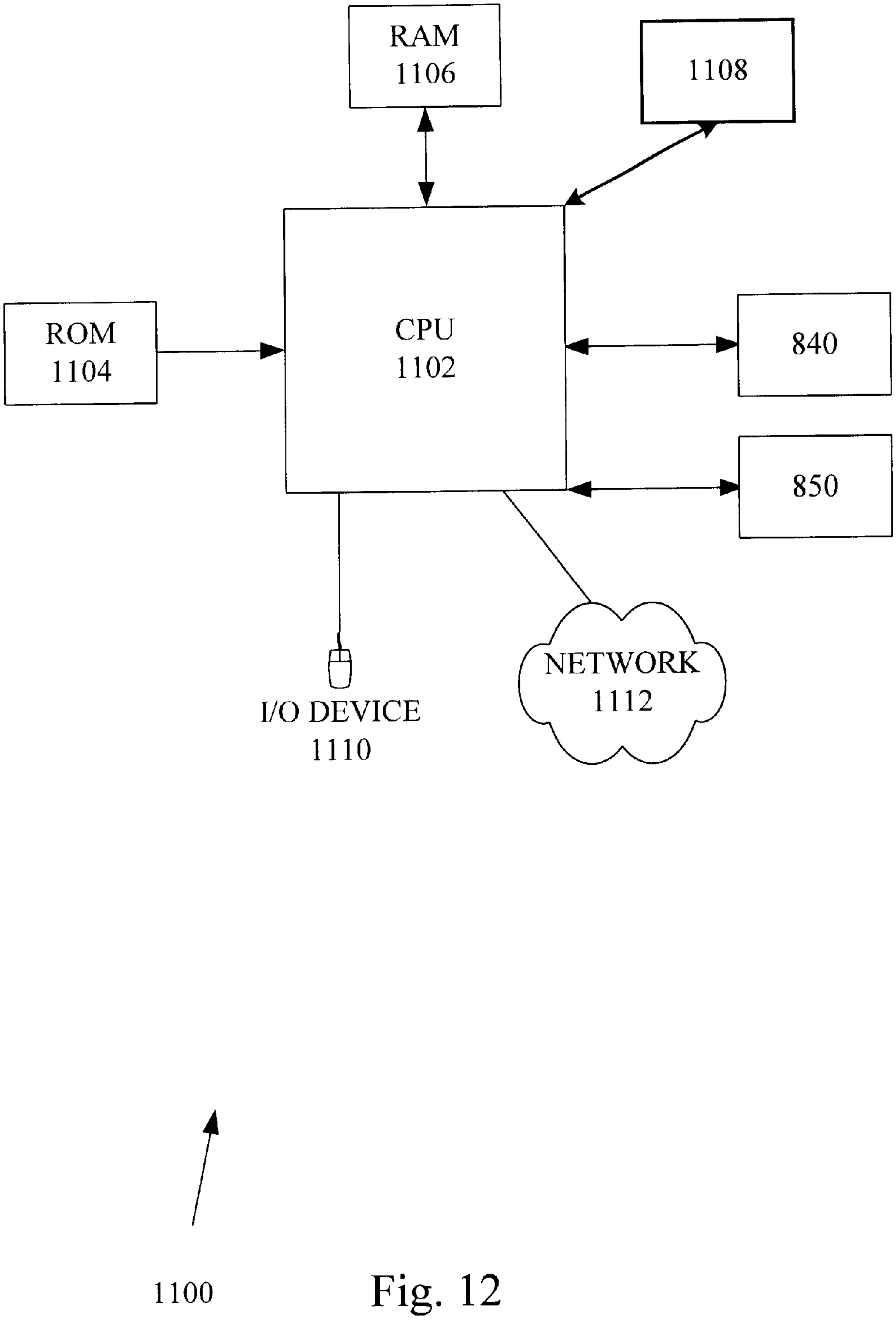
FIG. 12 illustrates a computer system employed to implement the invention.

FIG. 12 illustrates a computer system 1100 employed to implement the invention. As is well known in the art, ROM acts to transfer data and instructions uni-directionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data uni-directionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g., an Internet network or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the apparatus and methods for detecting flicker in a digital image have been described in terms of an RGB based system, the apparatus and methods may generally be applied in any suitable color space. Therefore, the present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are may alternative ways of implementing both the process and apparatus of the present invention. It is therefore intended that the invention be interpreted as including all such alterations, permutations, and equivalents as fall within the true spirit and scope of the present invention.

What is claimed is:

1. A flicker pattern detector coupled to a video signal source suitable for detecting a sub-pixel pair susceptible to producing a flicker event in an image displayed on a liquid crystal display (LCD) unit, comprising:

a two dimensional flicker pattern analyzer arranged to perform a two dimensional flicker pattern analysis on a selected group of sub-pixels some of which are included in a first plurality of sub-pixels that includes a first current sub-pixel and a first previous sub-pixel included in a first video frameline and a remainder of which are included in a second plurality of sub-pixels included in a second video frameline that is received, in real time, from the video signal source that includes a second current sub-pixel and a second previous sub-pixel, wherein the two dimensional flicker pattern analyzer includes, a first storage device suitable for storing the first plurality of sub-pixels, a second storage device coupled to the first storage device suitably arranged to store the first current sub-pixel, a third storage device arranged to store a the second current sub-pixel, and a comparator unit coupled to the first storage device, the second storage device and the third storage device arranged to, perform a two dimensional compare operation, and update a final flicker frame score based upon the compare operation indicative of the susceptibility of producing a flicker event in an image displayed on a liquid crystal display (LCD) unit.

2. A flicker pattern detector as recited in claim 1, wherein during the compare operation the comparator compares the first current sub-pixel to the first previous sub-pixel stored in the first storage device, the first current sub-pixel to the second current sub-pixel, the second current sub-pixel to the second previous sub-pixel received, and the second previous sub-pixel to the first previous sub-pixel.

3. A flicker pattern detector as recited in claim 1, further comprising:

a one dimensional flicker pattern analyzer arranged to perform a one dimensional flicker pattern analysis on a previous sub-pixel included in the first frameline and a current sub-pixel included in the second frameline, wherein the one dimensional flicker pattern analyzer includes, a fourth storage device suitable for storing the previous sub-pixel, a second comparator unit coupled to the fourth storage device arranged to compare the previous sub-pixel and a current sub-pixel received in real time from the video signal source and based upon the compare, updates the final flicker frame score.

4. A detector as recited in claim 1, wherein the first storage device is a line buffer, wherein the second storage device is a first latch unit, and wherein the third storage device is a second latch unit.

5. A detector as recited in claim 3, wherein the fourth storage device is a flip flop unit.

6. A detector as recited in claim 4 further comprising a flicker event signal generator coupled to the first comparator and the second comparator arranged to receive the final flicker frame score.

7. A detector as recited in claim 4, further comprising a flicker correction circuit coupled to the flicker event signal generator.

8. A detector as recited in claim 7 wherein, based upon the final flicker frame score, the flicker event signal generator provides a flicker event signal to the flicker correction circuit which responds by flicker correction signal.

9. A method for detecting a sub-pixel pair susceptible of producing a flicker event in an image from a video signal source displayed on a liquid crystal display (LCD) unit, comprising:

performing a two dimensional flicker pattern analysis based upon a difference in Δtransparency/Δvoltage for selected sub-pixel pairs of a selected group of sub-pixels some of which are included in a first plurality of sub-pixels that includes a first current sub-pixel and a first previous sub-pixel included in a first video frameline and a remainder of which are included in a second plurality of sub-pixels included in a second video frameline that is received, in real time, from the video signal source that includes a second current sub-pixel and a second previous sub-pixel.

10. A method as recited in claim 9, further comprising:

storing the first plurality of sub-pixels in a first storage device;

storing the first current sub-pixel in a second storage device coupled to the first storage device;

storing the second current sub-pixel in a third storage device comparing the first current sub-pixel to the first previous sub-pixel;

comparing the first current sub-pixel to the second current sub-pixel;

comparing the second current sub-pixel to the second previous sub-pixel;

comparing the second previous sub-pixel to the first previous sub-pixel; and updating a final flicker frame score based upon the compare operation indicative of the susceptibility of producing a flicker event in an image displayed on a liquid crystal display (LCD) unit.

11. A method as recited in claim 9, further comprising:

performing a one dimensional flicker pattern analysis on a previous sub-pixel included in the first frameline and a current sub-pixel included in the second frameline.

12. A method as recited in claim 11, wherein the performing a one dimensional flicker pattern search comprises:

storing the previous sub-pixel;

comparing the previous sub-pixel and a current sub-pixel received in real time from the video signal source; and updating the final flicker frame score based upon the comparing.

13. A method as recited in claim 12 further comprising a flicker event signal generator coupled to the first comparator and the second comparator arranged to receive the final flicker frame score.

14. A method as recited in claim 13, further comprising a flicker correction circuit coupled to the flicker event signal generator.

15. A method as recited in claim 14 wherein, based upon the final flicker frame score, the flicker event signal generator provides a flicker event signal to the flicker correction circuit which responds by flicker correction signal.

16. A method as recited in claim 9, wherein the first storage device is a line buffer, wherein the second storage device is a first latch unit, and wherein the third storage device is a second latch unit.

17. A method for detecting a sub-pixel pair susceptible of producing a flicker event in an image from a video source displayed on a LCD unit comprising:

performing a two dimensional flicker pattern analysis based upon a difference in Δtransparency/Δvoltage for selected sub-pixel pairs of a selected group of sub-pixels some of which are included in a first plurality of sub-pixels that includes a first current sub-pixel and a first previous sub-pixel included in a first video frame line and a remainder of which are included in a second plurality of sub-pixels included in a second video frameline that is received in real time from the video signal source that includes a second current sub-pixel and a second previous sub-pixel.

18. Computer program product as recited in claim 17, further comprising:

computer code for storing the first plurality of sub-pixels in a first storage device;

computer code for storing the first current sub-pixel in a second storage device coupled to the first storage device;

computer code for storing the second current sub-pixel in a third storage device computer code for comparing the first current sub-pixel to the first previous sub-pixel;

computer code for comparing the first current sub-pixel to the second current sub-pixel;

computer code for comparing the second current sub-pixel to the second previous sub-pixel;

computer code for comparing the second previous sub-pixel to the first previous sub-pixel; and computer code for updating a final flicker frame score based upon the compare operation indicative of the susceptibility of producing a flicker event in an image displayed on a liquid crystal display (LCD) unit.

19. A method as recited in claim 18, further comprising:

performing a one dimensional flicker pattern analysis on a previous sub-pixel included in the first frameline and a current sub-pixel included in the second frameline.

20. A method as recited in claim 19, wherein the performing a one dimensional flicker pattern search comprises:

storing the previous sub-pixel;

comparing the previous sub-pixel and a current sub-pixel received in real time from the video signal source; and updating the final flicker frame score based upon the comparing.

21. A method for detecting a sub-pixel pair susceptible of producing a flicker event in an image from a video signal source displayed on a liquid crystal display (LCD) unit, comprising:

performing a two dimensional flicker pattern analysis on a selected group of sub-pixels some of which are included in a first plurality of sub-pixels that includes a first current sub-pixel and a first previous sub-pixel included in a first video frameline and a remainder of which are included in a second plurality of sub-pixels included in a second video frameline that is received, in real time, from the video signal source that includes a second current sub-pixel and a second previous sub-pixel storing the first plurality of sub-pixels in a first storage device;

storing the first current sub-pixel in a second storage device coupled to the first storage device;

storing the second current sub-pixel in a third storage device comparing the first current sub-pixel to the first previous sub-pixel;

comparing the first current sub-pixel to the second current sub-pixel;

comparing the second current sub-pixel to the second previous sub-pixel;

comparing the second previous sub-pixel to the first previous sub-pixel; and updating a final flicker frame score based upon the compare operation indicative of the susceptibility of producing a flicker event in an image displayed on a liquid crystal display (LCD) unit.

22. A method as recited in claim 21, further comprising:

performing a one dimensional flicker pattern analysis on a previous sub-pixel included in the first frameline and a current sub-pixel included in the second frameline.

23. A method as recited in claim 22, wherein the performing a one dimensional flicker pattern search comprises:

storing the previous sub-pixel;

comparing the previous sub-pixel and a current sub-pixel received in real time from the video signal source; and updating the final flicker frame score based upon the comparing.

24. A method as recited in claim 21, wherein the first storage device is a line buffer, wherein the second storage device is a first latch unit, and wherein the third storage device is a second latch unit.

25. A method as recited in claim 24 further comprising a flicker event signal generator coupled to the first comparator and the second comparator arranged to receive the final flicker frame score.

26. A method as recited in claim 25, further comprising a flicker correction circuit coupled to the flicker event signal generator.

27. A method as recited in claim 26 wherein, based upon the final flicker frame score, the flicker event signal generator provides a flicker event signal to the flicker correction circuit which responds by flicker correction signal.

28. Computer program product for enabling a computer to perform a method for detecting a sub-pixel pair susceptible of producing a flicker event in an image from a video signal source displayed on a liquid crystal display (LCD) unit, comprising:

computer code for performing a two dimensional flicker pattern analysis on a selected group of sub-pixels some of which are included in a first plurality of sub-pixels that includes a first current sub-pixel and a first previous sub-pixel included in a first video frameline and a remainder of which are included in a second plurality of sub-pixels included in a second video frameline that is received, in real time, from the video signal source that includes a second current sub-pixel and a second previous sub-pixel;

computer code for storing the first plurality of sub-pixels in a first storage device;

computer code for storing the first current sub-pixel in a second storage device coupled to the first storage device;

computer code for storing the second current sub-pixel in a third storage device computer code for comparing the first current sub-pixel to the first previous sub-pixel;

computer code for comparing the first current sub-pixel to the second current sub-pixel;

computer code for comparing the second current sub-pixel to the second previous sub-pixel;

computer code for comparing the second previous sub-pixel to the first previous sub-pixel;

computer code for updating a final flicker frame score based upon the compare operation indicative of the susceptibility of producing a flicker event in an image displayed on a liquid crystal display (LCD) unit; and computer readable medium for storing the computer code.

29. Computer program product as recited in claim 28, further comprising:

computer code for performing a one dimensional flicker pattern analysis on a previous sub-pixel included in the first frameline and a current sub-pixel included in the second frameline.

30. Computer program product as recited in claim 29, wherein the performing a one dimensional flicker pattern search comprises:

storing the previous sub-pixel;

comparing the previous sub-pixel and a current sub-pixel received in real time from the video signal source; and updating the final flicker frame score based upon the comparing.

31. Computer program product as recited in claim 28, wherein the first storage device is a line buffer, wherein the second storage device is a first latch unit, and wherein the third storage device is a second latch unit.

32. Computer program product as recited in claim 31 further comprising a flicker event signal generator coupled to the first comparator and the second comparator arranged to receive the final flicker frame score.

33. A flicker pattern detector coupled to a video signal source suitable for detecting a sub-pixel pair susceptible to producing a flicker event in an image displayed on a liquid crystal display (LCD) unit, comprising:

a two dimensional flicker pattern analyzer arranged to perform a two dimensional flicker pattern analysis based upon a difference in Δtransparency/Δvoltage for selected sub-pixel pairs of a selected group of sub-pixels some of which are included in a first plurality of sub-pixels that includes a first current sub-pixel and a first previous sub-pixel included in a first video frameline and a remainder of which are included in a second plurality of sub-pixels included in a second video frameline that is received, in real time, from the video signal source that includes a second current sub-pixel and a second previous sub-pixel.

34. A flicker pattern detector as recited in claim 33, further comprising:

a first storage device suitable for storing the first plurality of sub-pixels, a second storage device coupled to the first storage device suitably arranged to store the first current sub-pixel, a third storage device arranged to store a the second current sub-pixel, and a comparator unit coupled to the first storage device, the second storage device and the third storage device arranged to, perform a two dimensional compare operation, and update a final flicker frame score based upon the compare operation indicative of the susceptibility of producing a flicker event in an image displayed on a liquid crystal display (LCD) unit.

35. A flicker pattern detector as recited in claim 33, wherein during the compare operation the comparator compares the first current sub-pixel to the first previous sub-pixel stored in the first storage device, the first current sub-pixel to the second current sub-pixel, the second current sub-pixel to the second previous sub-pixel received, and the second previous sub-pixel to the first previous sub-pixel.

36. A flicker pattern detector as recited in claim 33, further comprising:

a one dimensional flicker pattern analyzer arranged to perform a one dimensional flicker pattern analysis on a previous sub-pixel included in the first frameline and a current sub-pixel included in the second frameline, wherein the one dimensional flicker pattern analyzer includes, a fourth storage device suitable for storing the previous sub-pixel, a second comparator unit coupled to the fourth storage device arranged to compare the previous sub-pixel and a current sub-pixel received in real time from the video signal source and based upon the compare, updates the final flicker frame score.

37. A detector as recited in claim 36, wherein the fourth storage device is a flip flop unit.

38. A detector as recited in claim 33, wherein the first storage device is a line buffer, wherein the second storage device is a first latch unit, and wherein the third storage device is a second latch unit.

39. A detector as recited in claim 37 further comprising a flicker event signal generator coupled to the first comparator and the second comparator arranged to receive the final flicker frame score.

40. A detector as recited in claim 39, further comprising a flicker correction circuit coupled to the flicker event signal generator.

41. A detector as recited in claim 40 wherein, based upon the final flicker frame score, the flicker event signal generator provides a flicker event signal to the flicker correction circuit which responds by flicker correction signal.

42. A detector as recited in claim 41, further comprising a flicker correction circuit coupled to the flicker event signal generator.

43. A detector as recited in claim 42 wherein, based upon the final flicker frame score, the flicker event signal generator provides a flicker event signal to the flicker correction circuit which responds by flicker correction signal.

* * * * *